May 25, 1943.  I. BRENNER  2,320,215
CLOTHES COMPARTMENT FOR VEHICLE SEATS
Filed Oct. 17, 1941
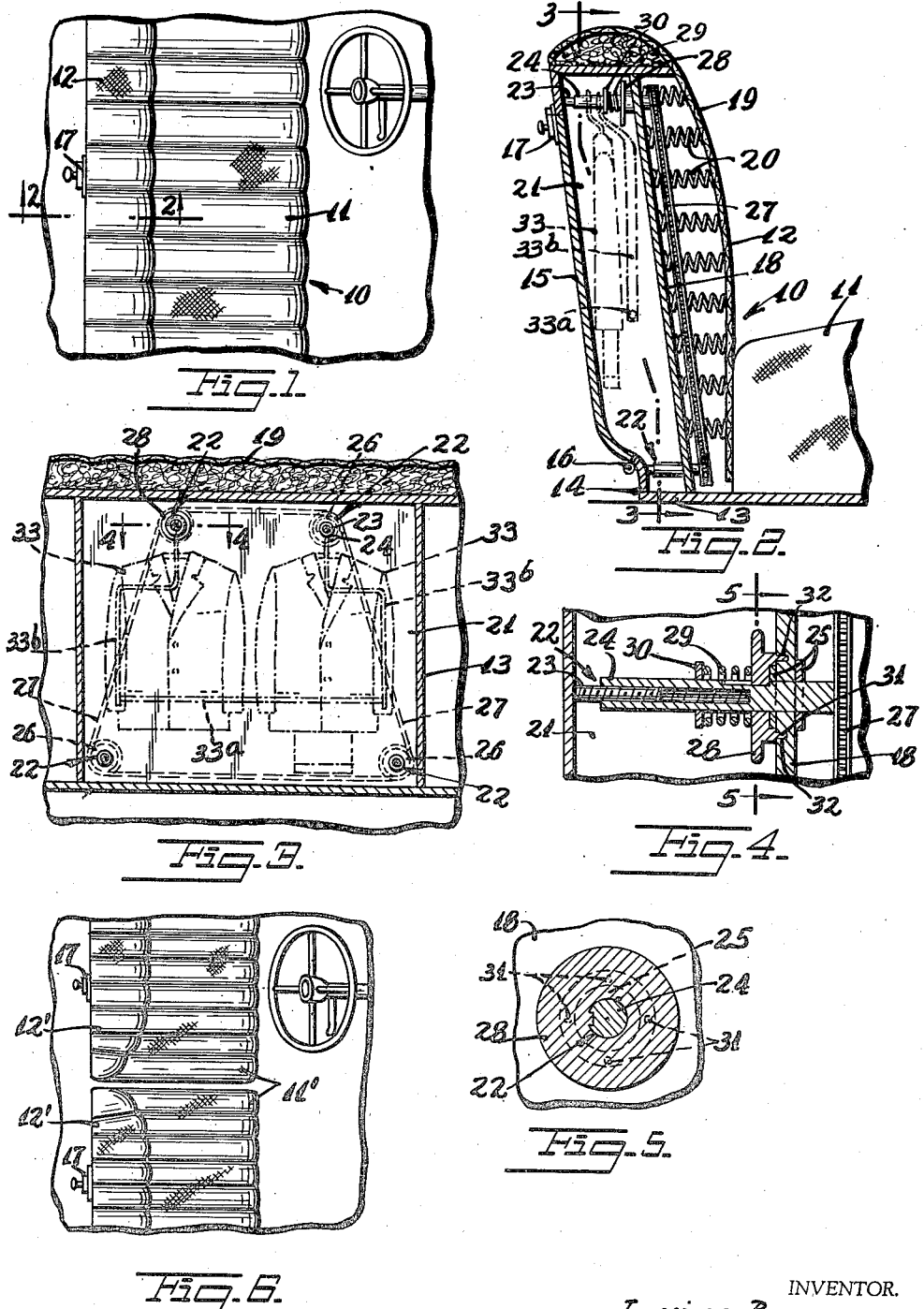

Patented May 25, 1943

2,320,215

UNITED STATES PATENT OFFICE 2,320,215

CLOTHES COMPARTMENT FOR VEHICLE SEATS

Irving Brenner, Bronx, N. Y.

Application October 17, 1941, Serial No. 415,444

8 Claims. (Cl. 155—190)

This invention relates to new and useful improvements in a vehicle seat wardrobe.

More specifically, the invention proposes the construction of clothes compartments for vehicle seats characterized by a chamber formed in the back of a vehicle seat and accessible through a door arranged in connection therewith for permitting articles of clothing to be conveniently hung within this chamber, eliminating the necessity of packing such articles of apparel as men's clothing, coats, dresses, etc., into suitcases and similar containers.

Still further it is proposed to characterize the chamber by a frame having a partition wall closing the one side thereof and against which the conventional springs of the automobile seat are adapted to engage.

Still further the invention proposes a means for holding the partition wall of the chamber in various adjusted positions relative to the door thereof for controlling the operative size of the chamber and for simultaneously tensioning the springs of the automobile seat as controlled by the movement of the rear wall forwards and rearwards.

A further object of the invention proposes the use of telescopic members arranged in connection with the partition wall and connected together for simultaneous operation to move the partition wall as one of the telescopic members is adjusted.

For further comprehension of this invention, and of the objects and advantages thereof, reference will be had to the following description and accompanying drawing, and to the appended claims in which the various novel features of the invention are more particularly set forth.

In the accompanying drawing forming a material part of this disclosure:

Fig. 1 is a partial elevational view of a vehicle seat constructed to have a wardrobe in accordance with this invention.

Fig. 2 is a vertical sectional view of the back portion of the seat shown in Fig. 1 and taken on the line 2—2 thereof.

Fig. 3 is a vertical sectional view taken on the line 3—3 of Fig. 2.

Fig. 4 is a horizontal sectional view taken on the line 4—4 of Fig. 3.

Fig. 5 is a vertical sectional view taken on the line 5—5 of Fig. 4.

Fig. 6 is a view of a vehicle having adjacent front seat members with wardrobes constructed in accordance with this invention.

The vehicle seat wardrobe, according to this invention, is formed in a vehicle seat 10 having a seat member 11 and a back 12. The back 12 includes a frame 13 of substantially rectangular shape and having a back wall 14 closing the same. The back wall 14 is formed with a door 15. This door 15 is pivotally supported at its bottom edge by means of hinges 16 upon a portion of the back wall 14. The top edge of the door 15 is adapted to be held in a closed position by a manually releasable lock member 17 of conventional construction. A partition wall 18 is mounted within the frame 13 and divides off a rear wardrobe chamber within the back portion of the seat 12. An upholstery face member 19 is mounted on the front of the frame and has its springs 20 engaging against the partition wall 18, as shown in Fig. 2.

Means is provided for holding the partition wall 18 in various fixed positions within the frame 13 for controlling the tension of the springs 20 and for simultaneously controlling the capacity of the chamber 21. This means comprises a pair of telescopic members 22 arranged adjacent each of the corners of the partition wall 18 and between the partition wall 18 and the back wall 14. Each telescopic member comprises a fixed portion 23 welded fixedly in position upon the back wall 14, and a tubular portion 24 rotatively extended through the partition wall 18. The tubular portion 24 is maintained in a fixed rotative position with relation to the partition wall 18 by means of a pair of collars 25 welded fixedly in position upon each of the tubular portions 24 on either side of the partition wall 18. A thread having a sharp angle of helix is formed upon the adjacent faces of the portions 23 and 24 of the telescopic members 22 to cause a rapid movement of the partition wall 18 as the tubular portions 24 re turned.

Means is provided for connecting together all of the tubular members 22 for simultaneous movement to cause the partition wall 18 to be properly moved. This means comprises a sprocket wheel 26 mounted upon the free end of each of the tubular portions 24 which is extended through the partition wall 18. A sprocket chain 27 is engaged continuously around the sprocket wheels 26 for causing all of the wheels to rotate when it is moved.

Means is provided within the chamber 21 and on one of the tubular members 22 for facilitating rotation thereof to be imparted to each of the other tubular members 22 through the medium of the sprocket chain 27. This means comprises a wheel 28 mounted on the tubular portion 24 of one of the tubular members 22. This wheel 28 is keyed to its respective tubular portion 24 but is free to slide longitudinally thereon.

A spring 29 is coaxially mounted on the tubular portion 24 and operates between the adjacent faces of a collar 30 mounted upon the tubular portion 24 and the adjacent face of the wheel 28 for urging the wheel into face contact with the adjacent face of the partition wall 18.

Means is provided between the adjacent faces of the wheel 28 and the partition wall 18 for locking the wheel 28 against rotation to prevent the tension of the springs 20 from urging the partition wall 18 towards the back wall 15. This means comprises a plurality of pins 31 formed on the wheel 28 and which engage into complementary openings 32 formed in the partition wall 18. If it were not for these inter-engaging pins and openings the tension of the springs 20 when the partition wall 18 is urged away from the back wall 14, would tend to force the partition wall back to its starting position due to the sharp threads arranged between the portions 23 and 24 of the tubular member 22. In operation, articles of clothing are to be suspended from the tubular members 22, as indicate by the dot and dash lines 33 in Figs. 2 and 3.

A suitable hanger consisting of side arms 33ᵇ and a joining bar 33ᵃ may also be supported on the tubular members 22, so that blankets, outer coats, or other articles may be hung over the horizontal bar 33.

The operation of the device is as follows:

For storing articles of clothing within the chamber 21 the said articles are placed upon conventional coat hangers and the door 15 is opened to permit the articles of clothing to be passed into the chamber 21 so that the hooks of the coat hangers may be engaged on the tubular members 22.

If it should be found that the capacity of the chamber 21 is insufficient for the number of articles being placed therein the capacity thereof may be increased by passing one's hand into the chamber to grasp the wheel 28 and pull rearwards thereon. This will be done against the action of the spring 29 and withdraw the pins 31 from the openings 32, freeing the wheel 28 to be turned. When turned in the proper direction the wheel 28 will correspondingly turn the tubular portion 24 of its respective tubular member 22 and extend the tubular portion with relation to the fixed portion 23 and tend to move the partition wall 18 away from the rear wall 15. Similar rotation will be imparted to each of the tubular portions 24 of each of the other telescopic members 22 through the medium of the sprocket wheels 26 and chain 27, causing the partition wall 18 to be evenly moved away from the back wall 15.

This movement of the partition wall 18 away from the rear wall 15 may also be used for the purpose of increasing the tension on the springs 20 of the seat back to cause the seat back to be properly extended and meet the requirement of the particular person sitting thereon.

In the modification of the invention shown in Fig. 6, the wardrobe construction is shown applied to an automobile seat 10' which consists of a pair of adjacent seat members 11' having respective individual backs 12'. In this form of the invention each of the individual backs is provided with a wardrobe chamber constructed as previously directed and like reference numerals are used to identify like parts.

While I have illustrated and described the preferred embodiments of my invention, it is to be understood that I do not limit myself to the precise constructions herein disclosed and the right is reserved to all changes and modifications coming within the scope of the invention as defined in the appended claims.

Having thus described my invention, what I claim as new, and desire to secure by United States Letters Patent is:

1. In a vehicle seat having a back for said seat including a frame, a back wall closing the back of said frame and having a door, a partition wall movably mounted within said frame dividing off a rear wardrobe chamber, an upholstery face member mounted on the front of said frame and partition wall, telescopic members threadedly engaging one another, one portion of each of said telescopic members being fixedly mounted on said back wall and the other portion of each of said telescopic members being rotatively connected with said partition wall, a sprocket wheel fixedly mounted on the rotative portion of each of said telescopic members, a continuous chain connecting all of said sprocket wheels together for unitary movement, and means for rotating one of said rotative portions of said telescopic members to rotate all of said rotative portions through the medium of said chain to extend said rotative portions relative to said fixed portions and move said partition wall to control the capacity of said chamber.

2. In a vehicle seat having a back for said seat including a frame, a back wall closing the back of said frame and having a door, a partition wall movably mounted within said frame dividing off a rear wardrobe chamber, an upholstery face member mounted on the front of said frame and partition wall, telescopic members threadedly engaging one another, one portion of each of said telescopic members being fixedly mounted on said back wall and the other portion of each of said telescopic members being rotatively connected with said partition wall, a sprocket wheel fixedly mounted on the rotative portion of each of said telescopic members, a continuous chain connecting all of said sprocket wheels together for unitary movement, and means for rotating one of said rotative portions of said telescopic members to rotate all of said rotative portions through the medium of said chain to extend said rotative portions relative to said fixed portions and move said partition wall to control the capacity of said chamber, comprising a wheel mounted on the rotative portion of one of said telescopic members.

3. In a vehicle seat having a back for said seat including a frame, a back wall closing the back of said frame and having a door, a partition wall movably mounted within said frame dividing off a rear wardrobe chamber, an upholstery face member mounted on the front of said frame and partition wall, telescopic members threadedly engaging one another, one portion of each of said telescopic members being fixedly mounted on said back wall and the other portion of each of said telescopic members being rotatively connected with said partition wall, a sprocket wheel fixedly mounted on the rotative portion of each of said telescopic members, a continuous chain connecting all of said sprocket wheels together for unitary movement, and means for rotating one of said rotative portions of said telescopic members to rotate all of said rotative portions through the medium of said chain to extend said rotative portions relative to said fixed portions and move said partition wall to control the capacity of said chamber, comprising a wheel mounted on the rotative portion of one of said telescopic members and a releasable means on said wheel for locking its respective rotative portion against movement after being adjusted to similarly hold all of said rotative portions.

4. In a vehicle seat having a back for said seat including a frame, a back wall closing the back of said frame and having a door, a partition wall within said frame dividing off a rear wardrobe chamber, an upholstery face member mounted on the front of said frame and having its springs engaging against said partition wall and means for holding said partition wall in various fixed positions in said frame for controlling the tension of said springs and the capacity of said chamber.

5. In a vehicle seat having a back for said seat including a frame, a back wall closing the back of said frame and having a door, a partition wall within said frame dividing off a rear wardrobe chamber, an upholstery face member mounted on the front of said frame and having its springs engaging against said partition wall, and means for holding said partition wall in various fixed positions in said frame for controlling the tension of said springs and the capacity of said chamber, said means comprising a plurality of telescopic members arranged between the adjacent faces of said back wall and said partition wall, said telescopic members having a thread with a sharp angle of helix formed between the adjacent portions thereof, and means for connecting said telescopic members together for simultaneous movement.

6. In a vehicle seat having a back for said seat including a frame, a back wall closing the back of said frame and having a door, a partition wall within said frame dividing off a rear wardrobe chamber, an upholstery face member mounted on the front of said frame and having its springs engaging against said partition wall, and means for holding said partition wall in various fixed positions in said frame for controlling the tension of said springs and the capacity of said chamber, said means comprising a plurality of telescopic members arranged between adjacent faces of said back wall and said partition wall, said telescopic members having a thread with a sharp angle of helix formed between the adjacent portions thereof, and means for connecting said telescopic members together for simultaneous movement, said means comprising sprocket wheels mounted on certain of said telescopic members and a continuous sprocket chain engaging over said sprocket wheels.

7. In a vehicle seat having a back for said seat including a frame, a back wall closing the back of said frame and having a door, a partition wall within said frame dividing off a rear wardrobe chamber, an upholstery face member mounted on the front of said frame and having its springs engaging against said partition wall, and means for holding said partition wall in various fixed positions in said frame for controlling the tension of said springs and the capacity of said chamber, said means comprising a plurality of telescopic members arranged between the adjacent faces of said back wall and said partition wall, said telescopic members having a thread with a sharp angle of helix formed between the adjacent portions thereof, and means for connecting said telescopic members together for simultaneous movement, and means for locking one of said telescopic members against being rotated by the tension of said springs.

8. In a vehicle seat having a back for said seat including a frame, a back wall closing the back of said frame and having a door, a partition wall within said frame dividing off a rear wardrobe chamber, an upholstery face member mounted on the front of said frame and having its springs engaging against said partition wall, and means for holding said partition wall on various fixed positions in said frame for controlling the tension of said springs and the capacity of said chamber, said means comprising a plurality of telescopic members arranged between the adjacent faces of said back wall and said partition wall, said telescopic members having a thread with a sharp angle of helix formed between the adjacent portions thereof, and means for connecting said telescopic members together for simultaneous movement, and means for locking one of said telescopic members against being rotated by the tension of said springs, comprising a wheel longitudinally slidably mounted on one of said telescopic members to be used for rotating the same, pins formed on said wheel and engageable with complementary openings formed in said partition wall, and means for continuously urging said wheel towards said partition wall to insure the engagement of said pins with said openings.

IRVING BRENNER.